(12) United States Patent
Weller et al.

(10) Patent No.: US 10,769,434 B2
(45) Date of Patent: *Sep. 8, 2020

(54) MIRROR ASSEMBLY INCORPORATING A SCANNING APPARATUS

(71) Applicant: Gentex Corporation, Zeeland, MI (US)

(72) Inventors: Andrew D. Weller, Holland, MI (US); Nigel T. Lock, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 337 days.

This patent is subject to a terminal disclaimer.

(21) Appl. No.: 15/372,875

(22) Filed: Dec. 8, 2016

(65) Prior Publication Data

US 2017/0177935 A1 Jun. 22, 2017

Related U.S. Application Data

(60) Provisional application No. 62/271,013, filed on Dec. 22, 2015.

(51) Int. Cl.
*G06K 9/00* (2006.01)
*H04N 5/225* (2006.01)
(Continued)

(52) U.S. Cl.
CPC ............ *G06K 9/00604* (2013.01); *B60R 1/04* (2013.01); *B60R 1/12* (2013.01); *B60R 16/0231* (2013.01);
(Continued)

(58) Field of Classification Search
None
See application file for complete search history.

(56) References Cited

U.S. PATENT DOCUMENTS 5,928,572 A 7/1999 Tonar et al.
5,998,617 A 12/1999 Srinivasa et al.
(Continued)

FOREIGN PATENT DOCUMENTS

DE 102011083820 A1 4/2013
JP 05032125 4/1993
(Continued)

OTHER PUBLICATIONS

KostyaG. Postavil strelki povorotov v. bokovye zerkala. Chevrolet Captiva 2, 4 LT+white mother of pearl > Bortjournal > Delivered arrows of turns in the side mirrors [online] Dec. 16, 2012 [retrieved on Mar. 17, 2017]. Retrieved from the Internet: <URL: https://www.drive2.ru/1/441391>.
(Continued)

*Primary Examiner* — Stuart D Bennett
(74) *Attorney, Agent, or Firm* — Price Heneveld LLP; Bradley D. Johnson

(57) ABSTRACT

The disclosure provides for a scanning apparatus. The scanning apparatus may be disposed in a vehicle mirror assembly. The mirror assembly comprises an electrochromic element comprising a first substrate comprising a first surface and a second surface, and a second substrate comprising a third surface and a fourth surface. The mirror assembly further comprises an image sensor directed toward the fourth surface and configured to capture image data of an object through the electrochromic element. A light source is disposed proximate the fourth surface and configured to transmit an emission through the electrochromic element. The image sensor is configured to capture the image data to identify at least one passenger of the vehicle.

16 Claims, 5 Drawing Sheets

(51) Int. Cl.

| | | |
|---|---|---|
| *G02F 1/157* | (2006.01) | |
| *B60R 1/04* | (2006.01) | |
| *B60R 1/12* | (2006.01) | |
| *B60R 16/023* | (2006.01) | |
| *G02F 1/15* | (2019.01) | |
| *G02F 1/153* | (2006.01) | |
| *G06F 21/32* | (2013.01) | |
| *H04N 5/232* | (2006.01) | |
| *H04N 5/33* | (2006.01) | |
| *G02F 1/1514* | (2019.01) | |

(52) U.S. Cl.
CPC .............. *G02F 1/15* (2013.01); *G02F 1/157* (2013.01); *G02F 1/1533* (2013.01); *G06F 21/32* (2013.01); *G06K 9/00617* (2013.01); *G06K 9/00832* (2013.01); *H04N 5/2256* (2013.01); *H04N 5/23293* (2013.01); *H04N 5/33* (2013.01); *B60R 2001/1253* (2013.01); *G02F 1/153* (2013.01); *G02F 2001/1536* (2013.01); *G02F 2001/15145* (2019.01); *G02F 2201/58* (2013.01)

(56) References Cited

U.S. PATENT DOCUMENTS

| | | | |
|---|---|---|---|
| 6,020,987 A | 2/2000 | Baumann et al. | |
| 6,037,471 A | 3/2000 | Srinivasa et al. | |
| 6,137,620 A | 10/2000 | Guarr et al. | |
| 6,141,137 A | 10/2000 | Byker et al. | |
| 6,141,432 A | 10/2000 | Breed et al. | |
| 6,193,912 B1 | 2/2001 | Thieste et al. | |
| 6,241,916 B1 | 6/2001 | Claussen et al. | |
| 6,249,369 B1 | 6/2001 | Thieste et al. | |
| 6,519,072 B2 | 2/2003 | Nishikitani et al. | |
| 6,572,233 B1 | 6/2003 | Northman et al. | |
| 8,201,800 B2 | 6/2012 | Filipiak | |
| 8,210,695 B2 | 7/2012 | Roth et al. | |
| 8,237,909 B2 | 8/2012 | Ostreko et al. | |
| 8,264,761 B2 | 9/2012 | Cammenga et al. | |
| 8,339,526 B2 | 12/2012 | Minikey, Jr. et al. | |
| 8,411,245 B2 | 4/2013 | Lee et al. | |
| 8,643,931 B2 | 2/2014 | Cammenga et al. | |
| 8,646,924 B2 | 2/2014 | Roth et al. | |
| 8,814,373 B2 | 8/2014 | Steel et al. | |
| 8,827,517 B2 | 9/2014 | Cammenga et al. | |
| 8,925,891 B2 | 1/2015 | Van Huis et al. | |
| 8,960,629 B2 | 2/2015 | Rizk et al. | |
| 9,056,584 B2 | 6/2015 | Fish, Jr. et al. | |
| 9,174,577 B2 | 11/2015 | Busscher et al. | |
| 9,244,249 B2 | 1/2016 | Kim et al. | |
| 9,316,347 B2 | 4/2016 | Roth | |
| 2005/0270620 A1 | 12/2005 | Bauer et al. | |
| 2006/0050356 A1* | 3/2006 | Varaprasad | G02F 1/157 359/265 |
| 2009/0015736 A1* | 1/2009 | Weller | B60R 1/12 349/11 |
| 2009/0116097 A1 | 5/2009 | McCabe et al. | |
| 2012/0327234 A1 | 12/2012 | Fish, Jr. et al. | |
| 2013/0194650 A1 | 8/2013 | Roth et al. | |
| 2013/0311001 A1* | 11/2013 | Hampiholi | B60R 25/25 701/1 |
| 2014/0112554 A1* | 4/2014 | Chiu | G06K 9/00302 382/118 |
| 2014/0316607 A1 | 10/2014 | Le et al. | |
| 2015/0329054 A1 | 11/2015 | Neuman et al. | |
| 2017/0061110 A1 | 3/2017 | Wright et al. | |
| 2017/0068143 A1 | 3/2017 | Bruizeman | |

FOREIGN PATENT DOCUMENTS

| | | |
|---|---|---|
| JP | 2004189149 | 7/2004 |
| JP | 2006205923 A | 8/2006 |
| RU | 51771 U1 | 2/2006 |
| WO | 9842796 A1 | 10/1998 |
| WO | 9902621 A1 | 1/1999 |
| WO | 2014052658 A1 | 4/2014 |
| WO | 2014180840 A1 | 11/2014 |
| WO | 2017100495 A1 | 6/2017 |

OTHER PUBLICATIONS

International Search Report and Written Opinion of the International Searching Authority, or the Declaration, dated Mar. 30, 2017, for International Application No. PCT/US2016/065707, filed Dec. 9, 2016, 10 pages.

Commonly assinged co-pending U.S. Appl. No. 15/372,717, filed Dec. 8, 2016.

Commonly assinged co-pending U.S. Appl. No. 15/443,164, filed Feb. 27, 2017.

Commonly assinged co-pending U.S. Appl. No. 62/463,218, filed Feb. 24, 2017.

* cited by examiner

MIRROR ASSEMBLY INCORPORATING A SCANNING APPARATUS

CROSS-REFERENCE TO RELATED APPLICATION

This application claims priority to U.S. Provisional Application No. 62/271,013, filed on Dec. 22, 2015, entitled "MIRROR ASSEMBLY INCORPORATING A SCANNING APPARATUS," the disclosure of which is hereby incorporated herein by reference in its entirety.

TECHNOLOGICAL FIELD

The present invention generally relates to a mirror assembly, and more particularly, to a transflective mirror assembly with improved near infrared transmittance.

SUMMARY OF THE DISCLOSURE

According to one aspect of the present disclosure, a scanning apparatus is disclosed. The scanning apparatus may be disposed in a vehicle mirror assembly. The mirror assembly comprises an electrochromic element comprising a first substrate comprising a first surface and a second surface, and a second substrate comprising a third surface and a fourth surface. The mirror assembly further comprises an image sensor directed toward the fourth surface. The image sensor is configured to capture image data of an object through the electrochromic element. A light source is disposed proximate the fourth surface and configured to transmit an emission through the electrochromic element. The image sensor is configured to capture the image data to identify at least one passenger of the vehicle.

According to another aspect of the present disclosure, a method for identifying a vehicle passenger is disclosed. The method comprises emitting light in a near infrared spectrum from a scanning apparatus. The light is transmitted outward through an electrochromic element and received as reflected light from a subject proximate the scanning apparatus. The reflected light is transmitted through the electrochromic element captured in the form of image data. The image data is processed to generate an identification of the subject.

According to yet another aspect of the present disclosure, a vehicle passenger identification system is disclosed. The system comprises an electrochromic element comprising a first substrate comprising a first surface and a second surface, and a second substrate comprising a third surface and a fourth surface. An image sensor is directed toward the fourth surface and configured to capture image data of an object through the electrochromic element. A light source is disposed proximate to the fourth surface and configured to transmit an emission through the electrochromic element. The image sensor is configured to capture the image data to identify at least one passenger of the vehicle.

These and other features, advantages, and objects of the present invention will be further understood and appreciated by those skilled in the art by reference to the following specification, claims, and appended drawings.

DETAILED DESCRIPTION

Figure 1:
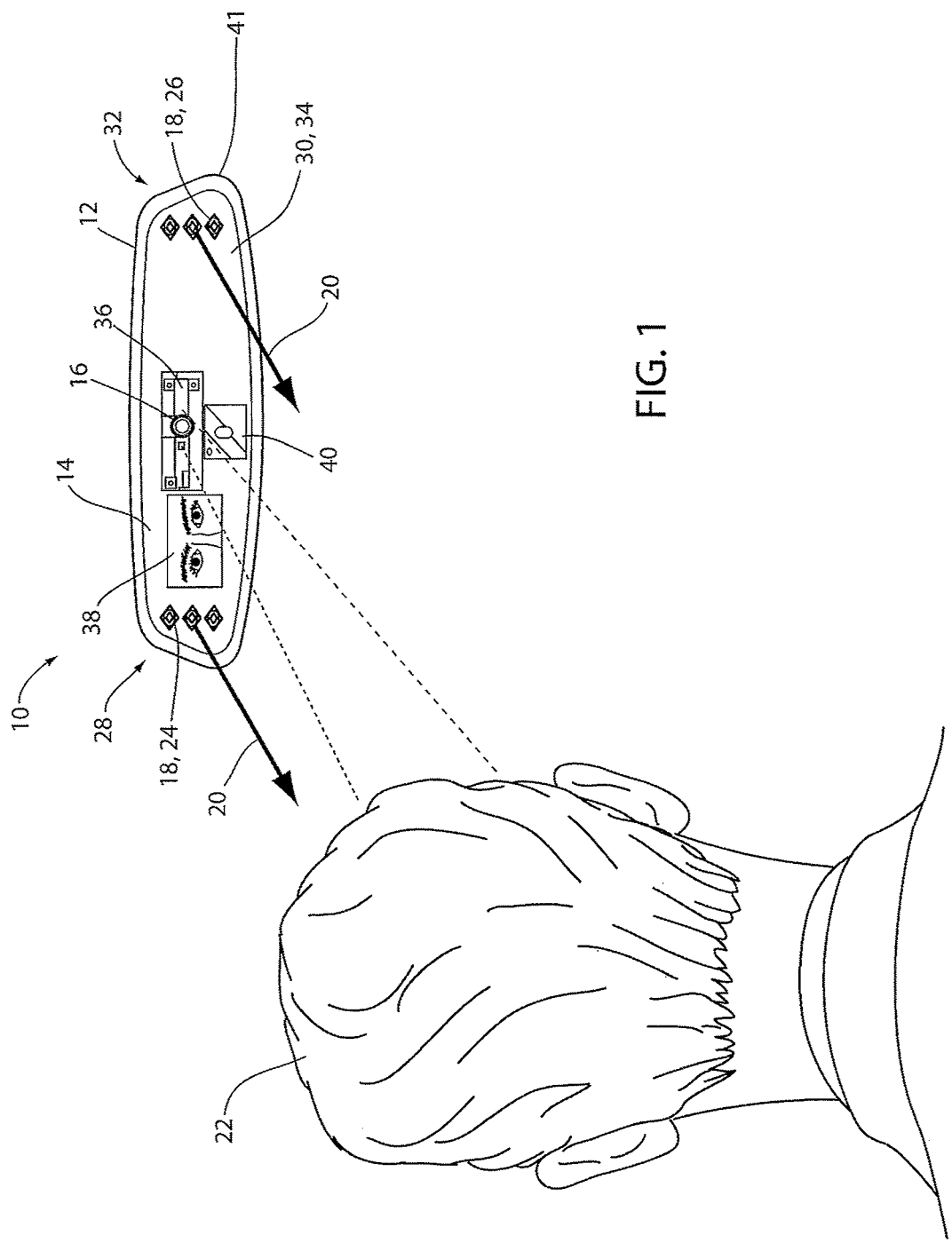
FIG. 1 is an illustrative view of a mirror assembly comprising a scanning apparatus.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
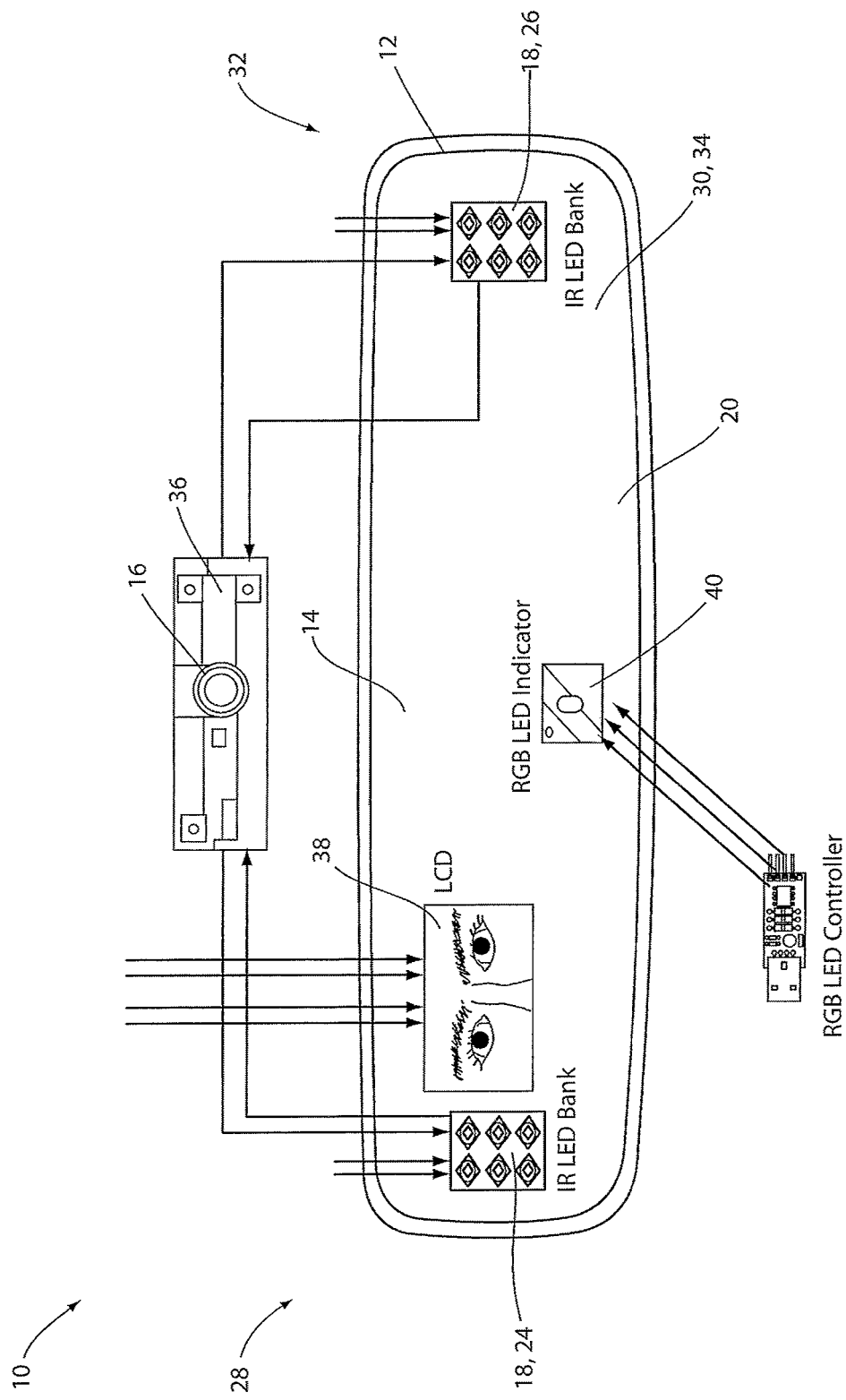
FIG. 2 is a schematic view of a mirror assembly comprising a scanning apparatus.

Referring to FIGS. 1 and 2, the disclosure provides for a scanning apparatus 10 operable to perform an identification function. In an exemplary embodiment, the scanning apparatus 10 is incorporated in an interior rearview mirror assembly 12 for an automotive vehicle. The mirror assembly 12 may correspond to an electro-optic assembly 14 having an electrochromic (EC) mirror element. The identification function may correspond to an eye-scan-identification function. In this configuration, the scanning apparatus 10 may provide for an interior rearview mirror assembly 12 configured to identify an operator of a vehicle based on the eye-scan identification function.

The eye-scan-identification function may utilize an infrared illumination of an iris of an eye in order to illuminate the eye for the identification. Such illumination may be optimized in conditions allowing for a high optical transmittance in the near infrared (NIR) range. In some embodiments, the disclosure may provide for an electrochromic (EC) stack of the electro-optic assembly that may have a high light transmittance in the NIR range, for example wavelengths of light ranging from 800 nm to 940 nm. Additionally, in some implementations, the electro-optic assembly may comprise a plurality of light sources configured to illuminate at least one iris of the operator of the vehicle.

To provide for the eye-scan-identification function, for example an iris scan, an image sensor 16 may be disposed proximate a rear surface of the electro-optic assembly. Further details regarding the relationship of the surfaces of the electro-optic assembly are discussed in reference to FIG. 3. The image sensor 16 may correspond to, for example, a digital charge-coupled device (CCD) or complementary metal-oxide-semiconductor (CMOS) active pixel sensor, although may not be limited to these exemplary devices. The image sensor 16 may be in communication with at least one light source 18, which may correspond to one or more infrared emitters configured to output an emission 20 of light in the NIR range. In this configuration, the image sensor 16 may be configured to selectively activate the one or more infrared emitters corresponding to the at least one light source 18 to illuminate the iris such that an identity of an operator 22 of the vehicle may be determined.

The infrared emitters or the light sources 18 may correspond to a plurality of infrared emitter banks. Each of the infrared emitter banks may comprise a plurality of light emitting diodes, which may be grouped in a matrix or otherwise grouped and disposed behind a rear surface of the electro-optic device. In an exemplary embodiment, the plurality of light sources 18 may correspond to a first emitter bank 24 and a second emitter bank 26. The first emitter bank 24 may be configured to output the emission in the NIR range from a first side portion 28 of a front surface 30 of the electro-optic assembly 14. The second emitter bank 26 may be configured to output the emission in the NIR range from a second side portion 32 of the front surface 30 of the electro-optic assembly 14, which may correspond to a mirror element 34 of the mirror assembly 12. In this configuration, the scanning apparatus 10 may be configured to illuminate the eyes of the operator 22 such that the image sensor 16 may capture image data including details of the irises of the eyes.

In an exemplary embodiment, each of the first emitter bank 24 and/or the second emitter bank 26 may correspond to more or fewer LEDs or banks of LEDs. In some embodiments comprising an electro-optic assembly having a high level of transmittance in the NIR range, the scanning apparatus 10 may utilize fewer or less intense LEDs. Examples of electro-optic assemblies having a high level of transmittance in the NIR range may correspond to assemblies comprising a transflective dielectric coating disposed on a fourth surface of the electro-optic assembly as further disclosed herein.

In some embodiments comprising an electro-optic assembly having a lower level of transmittance in the NIR range, the scanning apparatus 10 may utilize a greater number of or more intense LEDs. Electro-optic assemblies having a lower level of transmittance in the NIR range may correspond to assemblies comprising a metal-based, transflective coating disposed on a third surface of the electro-optic assembly. Further details describing various embodiments of electro-optic assemblies are discussed in reference to FIG. 3.

The image sensor 16 may be disposed on a circuit 36, for example a printed circuit board in communication with a controller. The controller may further be in communication with various devices that may be incorporated in the vehicle via the communication bus or any other suitable communication interface. The controller may correspond to one of more processors or circuits, which may be configured to process image data received from the image sensor 16. In this configuration, the image data may be communicated from the image sensor 16 to the controller. The controller may process the image data with one or more algorithms configured to determine an identity of the operator of the vehicle. Further detailed discussion of the controller and the various devices that may be in communication therewith are discussed in reference to FIG. 5.

The controller may further be in communication with a display 38. The display 38 may be disposed in the mirror assembly 12 behind the rear surface. The controller may be operable to display the image data received from the image sensor 16 such that the operator may view the image data. In this configuration, the operator 22 may adjust a position of the eyes shown on the display 38 to position the eyes such that the image data may include the necessary features required to identify the operator. In an exemplary embodiment, the features required to identify the operator of the vehicle may correspond to features of the eyes of the operator 22 (e.g. the irises).

The display 38 may correspond to a partial or full display mirror configured to display an image data through at least a portion of the mirror assembly 12. The display 38 may be constructed utilizing various technologies, for example LCD, LED, OLED, plasma, DLP or other display technology. Examples of display assemblies that may be utilized with the disclosure may include U.S. Pat. No. 6,572,233 "Rearview display mirror," U.S. Pat. No. 8,237,909 entitled "Vehicular rearview mirror assembly 12 including integrated backlighting for a liquid crystal display (LCD)," U.S. Pat. No. 8,411,245 "Multi-display mirror system and method for expanded view around a vehicle," and U.S. Pat. No. 8,339,526 "Vehicle rearview mirror assembly including a high intensity display," which are incorporated herein by reference in their entirety.

The scanning apparatus 10 may further comprise an indicator 40 in the mirror assembly 12. The indicator 40 may be in communication with the controller and configured to output a signal to identify a state of the scanning apparatus 10 and/or a rearview camera as discussed in reference to FIG. 5. The indicator 40 may correspond to a light source that may be operable to flash and/or change colors to communicate a state of the scanning apparatus 10. The indicator 40 may correspond to a light emitting diode (LED), and in an exemplary embodiment, the indicator 40 may correspond to a red, green, and blue (RGB) LED operable to identify the state of the scanning apparatus 10 by outputting one or more colored emissions of light.

The various components of the electro-optic assembly 14 and the scanning apparatus 10 may be contained within a housing 41 of the mirror assembly 12. In this way, the various components discussed herein may be substantially hidden from a view of the operator 22. Accordingly, the disclosure may provide for various advanced functions from the electro-optic assembly 14 and the scanning apparatus 10 while maintaining an appearance of a conventional rearview mirror.

Figure 3:
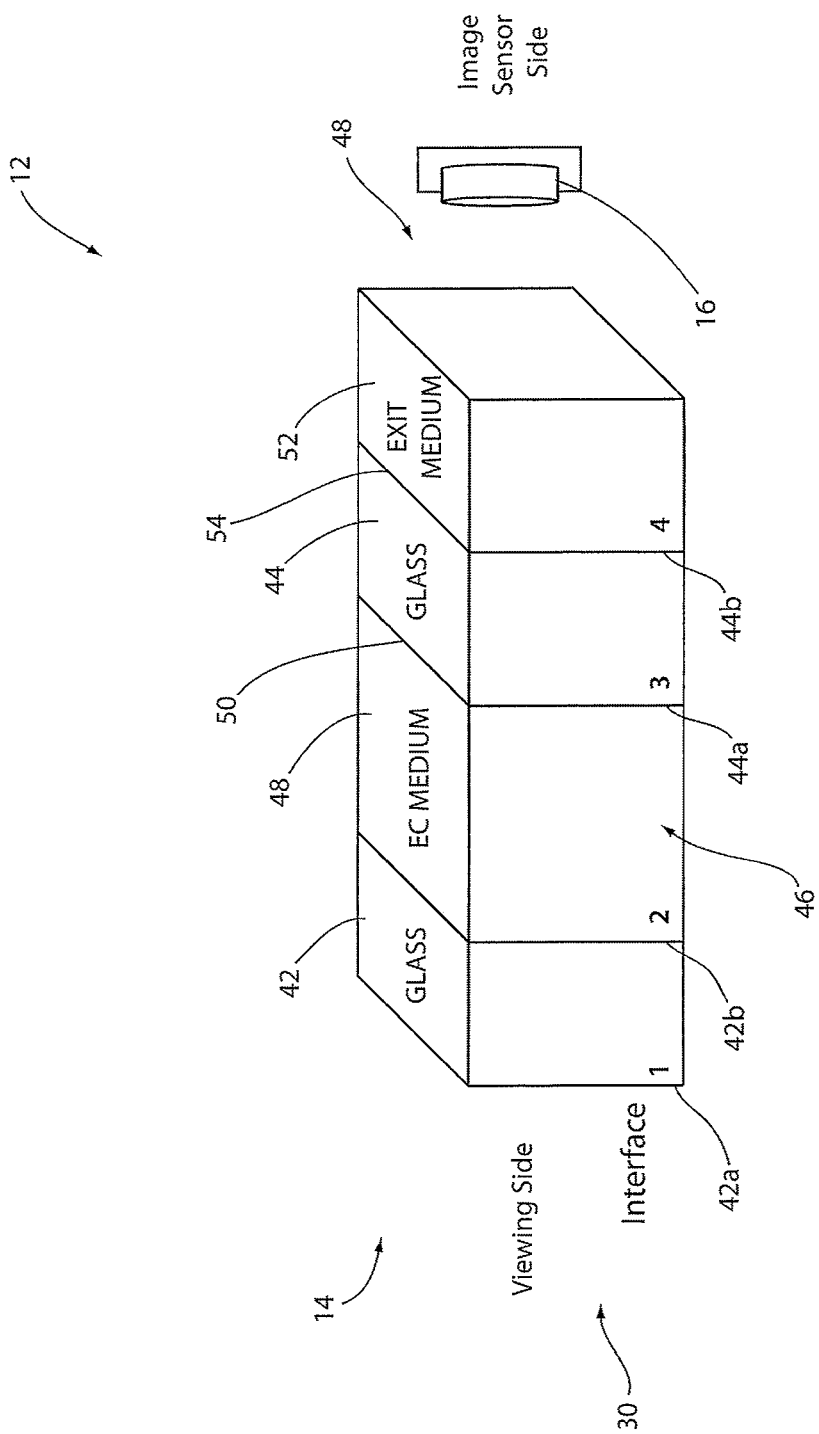
FIG. 3 is a cross-sectional view of an electro-optic assembly of the mirror assembly.

Referring to FIG. 3, a cross-sectional view of an electro-optic assembly 14 is shown. The electro-optic assembly 14 may be partially reflective and partially transmissive and comprise the mirror element 34. The mirror element 34 may include a first substrate 42 having a first surface 42a and a second surface 42b. The mirror element 34 may further comprise a second substrate 44 having a third surface 44a and a fourth surface 44b. The first substrate 42 and the second substrate 44 may define a cavity 46 and may be substantially parallel. The first surface 42a and the third surface 44a may be oriented toward the front surface 30 of the mirror assembly 12. The second surface 42b and the fourth surface 44b may be oriented toward a rear surface of the mirror assembly 12 or a housing of the mirror assembly. In this configuration, the contents of the housing including the image sensor 16 and the light source may be significantly hidden from view by the electro-optic assembly 14.

Though described as being disposed behind the electro-optic assembly 14, in some embodiments, the infrared emitters or the light source 18 may otherwise be attached to or disposed with the housing 41. Additionally, the at least one light source 18 may be remotely located relative to the mirror assembly 12. In such embodiments, the light source 18 may be in communication with a controller of the scanning apparatus 10. In the various embodiments, the light source 18 may be configured to project the emission 20 of light in the NIR range such that the image sensor 16 may receive light reflected from a subject of the scanning apparatus 10 (e.g. a passenger or operator). Accordingly, the scanning apparatus 10 may be utilized to suit a variety of applications without departing from the spirit of the disclosure.

The cavity 46 may contain an electro-optic medium 48, such as, but not limited to, an electrochromic medium. The cavity 46 may be completely or partially filled with the medium 48. The mirror assembly 12 may be in communication with a dimming controller via electrical contacts and may comprise various seals to retain the medium 48 in the cavity 46. In this configuration, the mirror assembly 12 may correspond to an electrochromic mirror element configured to vary in reflectivity in response to a control signal received from the dimming controller via the electrical contacts. The control signal may change an electrical potential supplied to the mirror assembly 12 to control the reflectivity.

Each of the surfaces 42a, 42b, 44a, and 44b correspond to interfaces of the mirror assembly 12. The first surface 42a corresponds to a first interface 1. The second surface 42b corresponds to a second interface 2. The third surface 44a corresponds to a third interface 3, and the fourth surface 44b corresponds to a fourth interface 4. In a conventional electro-optic assembly, a transflective coating 50 may typically be disposed on the third interface 3. The transflective coating 50 may typically comprise a layer containing silver along with additional layers such as metal, dielectric and/or transparent conducting oxides located above or below the silver comprising layer or both.

Figure 4:
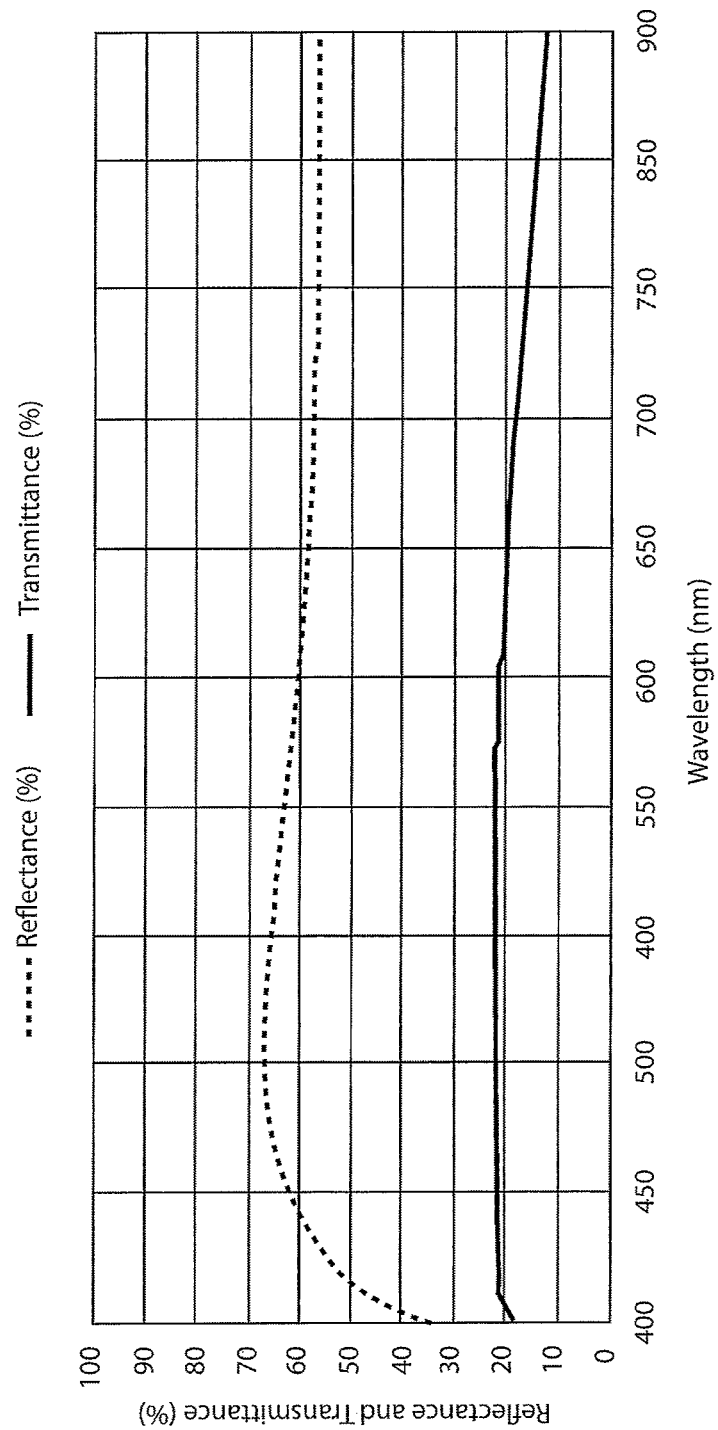
FIG. 4 is a plot demonstrating a reflectance and transmittance of a conventional electro-optic assembly comprising a transflective coating on a third surface.

As shown in Table 1, the electrochromic element with a transflective coating 50 may generally have a nominal reflectance of 65% and a nominal transmittance of 22% in the visible range. The visible reflectance and transmittance may vary depending on design considerations and design objectives. The transmittance in the NIR range may be less than the transmittance in the visible spectrum. An example of the transmittance in the NIR range of the metal-based, transflective coating 50 is shown in FIG. 4. Accordingly, the light source 18 may be configured to emit light in the NIR range at a higher intensity in some embodiments of the electro-optic assembly 14.

TABLE 1

Visible optical properties of transflective mirror with a metal-based, transflective coating 29.

|    | Reflectance | Transmittance |
|----|-------------|---------------|
| Y  | 65.00       | 21.86         |
| L* | 84.48       | 53.88         |
| a* | −4.35       | −0.31         |
| b* | 3.65        | 0.82          |

For example, if the at least one light source 18 is positioned behind the electro-optic assembly 14 with the image sensor 16, the emission of light from the light source 18 may pass outward through the electro-optic assembly 14. Additionally, the reflected light from the subject (e.g. the vehicle operator) on the viewing side is transmitted back through the electro-optic assembly 14. Accordingly, some embodiments of the metal-based, transflective coating 50 may inhibit the light source 18 and reduce the intensity of the energy of the light source 18 reaching the subject. Such embodiments of the metal-based, transflective coating 50 may also inhibit a returning signal to be captured by a receiver of the image sensor 16. For this reason, the intensity of the emission from the light source 18 may be increased when utilized with a metal-based, transflective coating 50.

In addition to transmittance concerns, the electro-optic assembly 14 may further be configured to maintain quality of the image data. For example, maintaining a neutral color in the transmitted light from the light source 18 and the reflected light returned to the image sensor 16 requires precise engineering of the coating materials and thicknesses on each of the interfaces 1-4. Such precision prevents color bias of the mirror and devices, such as the image sensor 16, configured rearward of the electrochromic element. Examples of materials and proportions operable to achieve such results are further detailed herein.

Still referring to FIG. 3, in some embodiments, the transflective coating may be implemented as a transflective dielectric coating 54 that may be applied to the fourth interface 4. The transflective dielectric coating 54 may be used to replace the metal-based, transflective coating 50. Transflective dielectric coating 54 is designed to resolve the issues related to the limited transmission in the NIR range for the mirror assembly 12 and provide NIR transmittance greater than about 20%. The dielectric coating 54 is designed to attain a reflectance level comparable to industry standard, i.e., about 40% to 85%, or about 50% to 75%, or about 55% to 70%. Additionally, the dielectric coating can be designed to attain a neutral color appearance in the visible color range for normal incidence viewing angle up to broad viewing angles. In this way, the disclosure provides for improved transmittance in the NIR range while maintaining visible color performance and mirror functionality.

The transflective dielectric coating 54 may comprise low-loss dielectric materials configured in an alternating high and low refractive index multi-layer stack. Examples of low-loss dielectric materials include, but are not limited to, niobium oxide, silicon oxide, tantalum oxide, aluminum oxide, etc. Additionally, with the tuning flexibility in an alternating high-index (H) and low-index (L) material multilayer (HL-Stack) construction, the transmittance of the dielectric coating 54 in the NIR range can be above 30% in some embodiments. In some embodiments, the NIR transmittance of the dielectric coating 54 may be greater than 50%. In an exemplary embodiment, the NIR transmittance of the dielectric coating 54 may be greater than 70%. In other embodiments, the NIR transmittance, for at least some wavelengths between about 800 and 940 nm, is greater than the visible transmittance, greater than 1.5 times the visible transmittance and greater than 2 times the visible transmittance.

The dielectric coating 54 may comprise a transmittance in the NIR range greater than 70%. Due to the low electric conductivity of the dielectric materials utilized in the dielectric coating 54, the dielectric coating 54 is not ideal for use as transflective electrode on surface 3 but may be utilized on the fourth interface 4. The dielectric coating 54 may be disposed on the fourth interface 4. On surface 3, an alternate transparent electrode, such as ITO, can be used to maintain the necessary high electric conductivity for the surface 3 electrode. The high electrical conductivity is required at the third interface to supply electrical current to the electro-optic medium 26 in order for the change in chemical state to occur.

Table 2 provides detailed, representative, examples of stack designs of dielectric transflective coatings at the fourth interface 4 of the mirror assembly 12 that provide appropriate visible transflective properties and enhanced NIR transmittance. In these examples, the high refractive index (H) material is Niobium Oxide and the low refractive index (L) material is Silicon Dioxide. It should be understood that these two examples are not meant to be limiting. Alternate dielectric coatings may have a quantity of layers between 3 and 14 or more than 14 layers. The number of layers needed to achieve the design goals will vary with the selection of the high and low refractive index materials. Fewer layers may be needed as the difference in refractive index between the two materials increases. Conversely, more layers may be needed if the refractive index difference is less. The refractive index difference may be greater than about 0.4, greater than about 0.6 or greater than about 0.8. Additional materials may be added which have refractive indices different that the high and low index materials.

TABLE 2

Dielectric transflective coating designs at the fourth interface of the mirror assembly.

| Front | Glass | | | |
|---|---|---|---|---|
| Layer No. | 5-layer Design | | 14-layer Design | |
| 1 | H | 98 nm | H | 56 nm |
| 2 | L | 100 nm | L | 27 nm |
| 3 | H | 51 nm | H | 58 nm |
| 4 | L | 91 nm | L | 72 nm |
| 5 | H | 50 nm | H | 56 nm |
| 6 | — | — | L | 103 nm |
| 7 | — | — | H | 75 nm |
| 8 | — | — | L | 130 nm |
| 9 | — | — | H | 17 nm |
| 10 | — | — | L | 178 nm |
| 11 | — | — | H | 59 nm |
| 12 | — | — | L | 25 nm |
| 13 | — | — | H | 17 nm |
| 14 | — | — | L | 175 nm |
| Back | Exit Medium | | | |

A theoretical performance in the visible range of the mirror assembly 12 with these example dielectric transflective coatings are given in Table 3. The modeled mirror assembly comprises a first piece of 1.6 mm glass with an ITO layer on surface 2 that is approximately 145 nm thick, a second piece of 1.6 mm glass with an ITO layer on surface 3 that is approximately 145 nm thick, a cell spacing (distance between surfaces 2 and 3) of about 140 microns, a perimeter seal of epoxy to create a chamber between the two pieces of glass and the chamber is filled with a gel based electrochromic media (described/reference elsewhere in this document). The dielectric, multi-layer coating 54 is on surface 4. The visible reflectance is maintained at 50-60% and visible transmittance is 30-40%. The CIELAB color coordinates a* and b* are maintained as small values (between −5 and 5) for both transmission and reflection spectra of 5 and 14 layer designs, which indicates good color neutral appearance. When changing the viewing angle, the spectrum usually shifts toward the short wavelength region and the different polarization states (electro-magnetic waves oscillating in orthogonal directions) typically react differently. Thus, both contribute to a color biasing of the spectra causing a color change on the appearance of the mirror.

TABLE 3

Visible optical properties of mirror with proposed coating designs at normal incidence:

| | 5-Layer-Design | | 14 Layer-Design | |
|---|---|---|---|---|
| | Reflectance | Transmittance | Reflectance | Transmittance |
| Y | 55.18 | 36.25 | 58.81 | 32.36 |
| L* | 79.14 | 66.71 | 81.19 | 63.64 |
| a* | −0.38 | −4.43 | −2.23 | −2.25 |
| b* | 3.32 | −1.52 | 1.51 | 0.51 |

Figure 5:
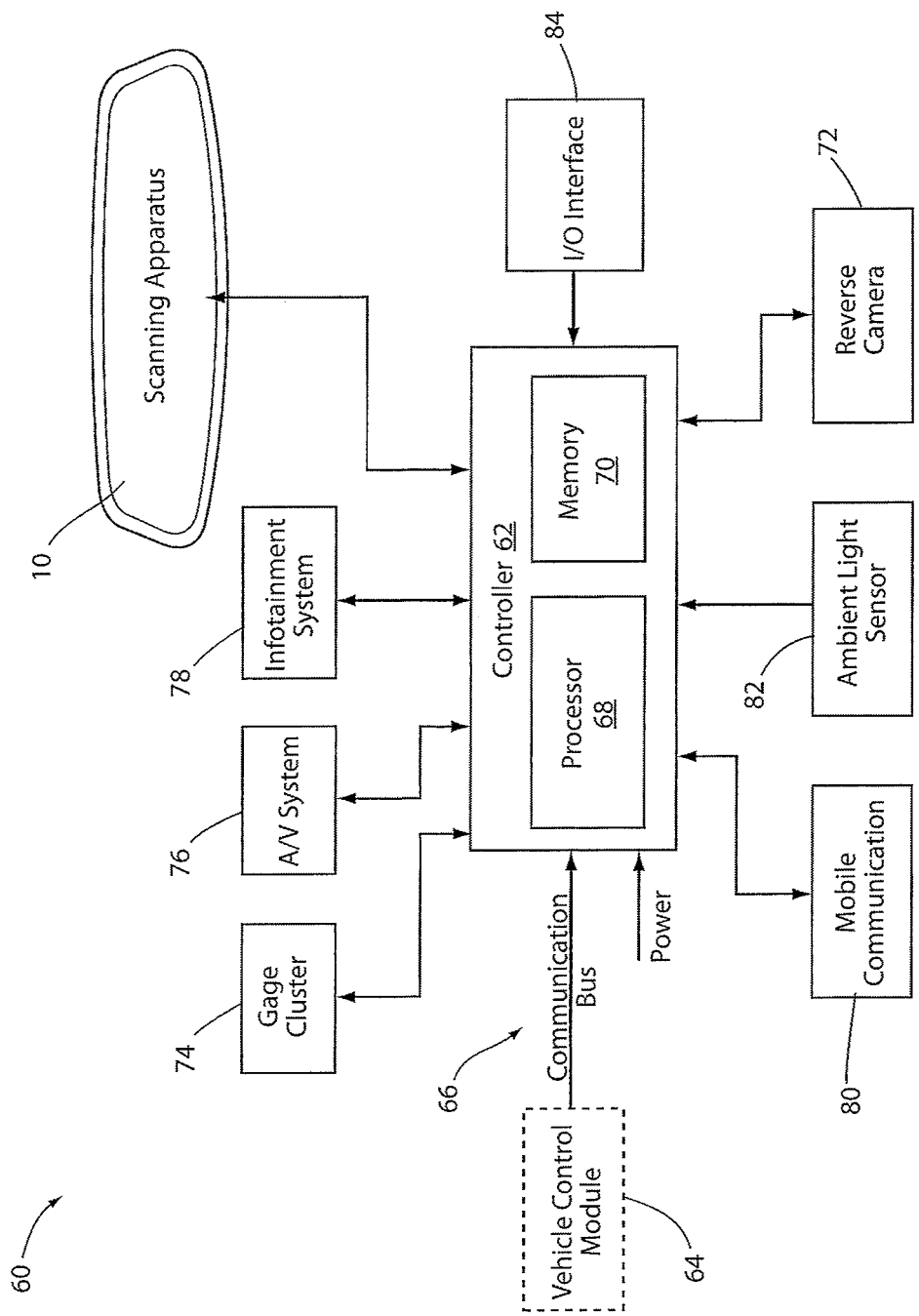
FIG. 5 is a block diagram of an identification system incorporating a scanning apparatus disposed in a mirror assembly in accordance with the disclosure.

Referring to FIG. 5, a block diagram of an identification system 60 incorporating the scanning apparatus 10 is shown. The controller 62 is shown in communication with the scanning apparatus 10 and may also be in communication with the vehicle control module 64 via a communication bus 66 of the vehicle. The communication bus 66 may be configured to deliver signals to the controller 62 identifying various vehicle states. For example, the communication bus 66 may be configured to communicate to the controller 62 a drive selection of the vehicle, an ignition state, a door open or ajar status, a remote activation of the scanning apparatus 10. Such information and control signals may be utilized by the controller 62 to activate or adjust various states and/or control schemes of the scanning apparatus 10 and/or the mirror assembly 12.

The controller 62 may comprise a processor 68 having one or more circuits configured to receive the signals from the communication bus 66 and control the scanning apparatus 10. The processor 68 may be in communication with a memory 70 configured to store instructions to control operations of the scanning apparatus 10. For example, the controller 62 may be configured to store one or more characteristics or profiles utilized by the controller 62 to identify the operator 22 of the vehicle. In this configuration, the controller 62 may communicate operating and identification information with the scanning apparatus 10 to identify the operator of the vehicle. Additionally, based on the identification of the operator 22, the controller 62 may be configured to control and/or communicate with additional systems of the vehicle. Such systems may include a security system, speed governor, radio/infotainment system, etc. In this way, one or more systems of the vehicle may be controlled or restricted based on the identity of the operator.

In some embodiments in response to an identification of a passenger or operator of the vehicle, the controller 62 may access a database of stored driver preferences to customize aspects of the vehicle or driver experience. For example, the controller 62 may access and enable radio station presets according to a driver's pre-established preferences. Navigation and/or map display settings may be changed or set according to a driver's pre-established preferences. Additionally, the database may comprise navigation information comprising known or previously visited locations. In particular, a route to home, work, or other frequently visited locations may be preset upon identification of a driver based on previous use or programming stored in the database.

The controller 62 may further be in communication with a reverse camera 72 or any other form of vehicle camera system. The controller 62 may receive image data from the reverse camera 72 corresponding to a rearward-directed field of view relative to the vehicle. In this configuration, the display 38 may provide for the rearward-directed field of view to be displayed when the display 38 is not utilized as for the identification process. The controller 62 may further be in communication with one or more of a gage cluster 74, an audio/video (A/V) system 76, an infotainment system 78, a media center, a vehicle computing system, and/or various other devices or systems of the vehicle. In various embodiments, the controller 62 may display image data from at least one of the image sensor 16 and the reverse camera 72 on the devices 74-78.

In an exemplary embodiment, the controller 62 may correspond to one of more processors or circuits. The controller 62 may be may be configured to process image data received from the image sensor 16. In this configuration, the controller 62 may process the image data with one or more algorithms configured to determine an identity of the operator of the vehicle. With the identity of the operator or one or more passengers of the vehicle identified, the controller 62 may further be operable to control various systems or functions of the vehicle.

For example, the controller 62 may be configured to authorize various setting or restrictions of settings for the vehicle based on an identification of the operator of the vehicle. The authorization may correspond to a speed governor, a payment authorization for toll roads or other transactional functions, a log of usage and timing for an identified operator, etc. In some implementations, the scanning apparatus may also be configured to document information corresponding to the usage and timing, for example, the number of passengers, a top speed of the vehicle, a maximum rate of acceleration, etc. In some embodiments, the controller 62 may further be in communication with a global position system (GPS) that may also provide regional restrictions for the operation of the vehicle.

In some embodiments, the controller 62 may utilize the identification of the operator of the vehicle to report updates to an administrator of the vehicle. For example, in some embodiments, the controller may further be in communication with a mobile communication system 80. The mobile communication system may be configured to communicate via various mobile communication protocols. Wireless communication protocols may operate in accordance with communication standards including, but not limited to: Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multi-point distribution systems (LMDS); multi-channel-multi-point distribution systems (MMDS); RFID; and/or variations thereof. In this configuration, the controller 62 may be configured to send an alert or message to the administrator of the vehicle in response to one or more predetermined event. The alert or message may correspond to a text message, data message, email, alert via an application operating on a smart device, etc.

A predetermined event may correspond to a wide variety of events that may be identified by the controller 62 based on an identity of an operator of the vehicle. For example, the event may correspond to the vehicle crossing a geographic boundary, an ignition even identifying vehicle operation, operation at during a restricted usage timing (e.g. a time between midnight and 5 am), an identification of a number of passengers in the vehicle exceeding a limit, etc. In this configuration, the controller 62 may identify a restricted user of the vehicle via the scanning apparatus 10 and provide notifications to the administrator.

In some embodiments, the controller 62 may also report that an operator of the vehicle has not been identified. This may be due to a malfunction or a deliberate attempt to avoid identification from the scanning apparatus 10. In response to the operation of the vehicle without identification, the administrator of the vehicle may be notified via a message submitted from the mobile communication system 80 reporting unauthorized or otherwise unfavorable activity of the vehicle. In this configuration, the administrator of the vehicle may be notified of any form of restricted activity that may be identified by the controller 62 corresponding to a restricted or unidentified operator of the vehicle.

The controller 62 may further be in communication with an ambient light sensor 82. The ambient light sensor 82 may be operable to communicate a light condition, for example a level brightness or intensity of the ambient light proximate the vehicle. In response to the level of the ambient light, the controller 62 may be configured to adjust a light intensity output from the display. In this configuration, the operator of the controller may adjust the brightness of the display to provide image data captured by at least one of the image sensor 16 and the reverse camera.

The controller 62 may further be in communication with an interface 84 configured to receive one or more inputs configured to control at least one of the scanning apparatus 10 and the reverse camera 72. In some embodiments, the interface 84 may be combined with one or more devices of the vehicle. For example, the interface 84 may form a portion of the gage cluster 74, the A/V system 76, the infotainment system 78, a display console and/or various input/output devices that may commonly be utilized in automotive vehicles (e.g. a steering switch, steering wheel controls, etc.). In this way, the disclosure provides for various control schemes for implementing the scanning apparatus 10 in a vehicle.

In some embodiments, the interface 84 may alternatively or additionally correspond to a keypad, fingerprint scanner, facial scanner, etc. In such configurations, the controller 62 may be operable to authenticate or identify a passenger or operator of the vehicle based on a multi-factor identification process. For example, the controller 62 may be configured to identify an operator or passenger of the vehicle in response to a first authentication and a second authentication. The first authentication may correspond to an iris scan detected via the scanning apparatus 10. The second authentication may correspond to a code or PIN entry into the keypad, a fingerprint scan via the fingerprint scanner, a facial scan via a camera or the scanning apparatus, etc. In this way, the disclosure may provide various levels of authentication for a variety of applications.

The mirror element 34 may be an electro-chromic element or an element such as a prism. One non-limiting example of an electro-chromic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety. The glass element 12 may also be any other element having partially reflective, partially transmissive properties. To provide electric current to the glass element 12, electrical elements are provided on opposing sides of the element, to generate an electrical potential therebetween. A J-clip 54 is electrically engaged with each electrical element, and element wires extend from the J-clips 54 to the primary PCB 28.

The present disclosure may be used with a mounting system such as that described in U.S. Pat. Nos. 8,814,373; 8,201,800; 8,210,695; 9,174,577; 8,925,891; and 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761 and 8,885,240; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of a display mirror assembly 128, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A scanning apparatus comprising:
an electrochromic element comprising:
a first substrate comprising a first surface and a second surface;
a second substrate comprising a third surface and a fourth surface,
wherein the first substrate and the second substrate form a cavity wherein a transflective dielectric coating comprising alternating layers of a plurality of high refractive index (H) materials and a plurality of low refractive index (L) materials is disposed on one of the third surface and the fourth surface; and
an electrochromic medium contained in the cavity;
an image sensor directed toward the fourth surface and configured to capture image data of an object through the electrochromic element;
a light source directed toward the fourth surface and configured to transmit an emission comprising detection light an a near infrared spectrum comprising a wavelength of light from 800 nm to 940 nm through the electrochromic element, wherein the image sensor is configured to capture the image data to identify a subject in the image data; and
a display disposed proximate the fourth surface, wherein the display is configured to present the image data output from the first surface, wherein the image data demonstrates the object in the image data configured to identify the subject and the image data output from the first surface is transmitted in a visible range of wavelengths comprising an average visible transmittance of at least 20% over a visible range of wavelengths from 400 nm to 700 nm, and wherein a near infrared transmittance of the detection light through the electrochromic element is greater than the average visible transmittance through the electrochromic element.

2. The scanning apparatus according to claim 1, wherein the first surface corresponds to a viewing side of the mirror assembly and the fourth surface is directed into a housing of the mirror assembly.

3. The scanning apparatus according to claim 2, wherein the image sensor is configured to capture the image data in a field of view directed outward from the first surface and through the electrochromic element.

4. The scanning apparatus according to claim 1, wherein the object corresponds to an eye of a passenger of the vehicle.

5. The scanning apparatus according to claim 1, wherein the light source is configured to emit light in a near infrared (NIR) range.

6. The scanning apparatus according to claim 1, further comprising a controller in communication with the image sensor and the light source, wherein the controller is configured to:
process the image data to identify the subject in the image data.

7. The scanning apparatus according to claim 6, wherein the controller is further configured to:
communicate an authorization signal to a vehicle control module to control one or more vehicle functions based on the identity of the subject, wherein the subject corresponds to a passenger of an automotive vehicle.

8. A method for identifying a vehicle passenger comprising:
emitting detection light in a near infrared spectrum comprising a wavelength of light from 800 nm to 940 nm from a scanning apparatus;
transmitting the detection light outward through an electrochromic element comprising a transflective dielectric coating;
receiving the detection light as reflected light reflected from a subject proximate the scanning apparatus;
transmitting the reflected light through the electrochromic element and the transflective dielectric element;
capturing the reflected light in the form of image data;
emitting display light demonstrating the image data and transmitting the display light over a range of visible wavelengths through the electrochromic element, wherein the range of visible wavelengths comprises an average visible transmittance of at least 20% over a visible range of wavelengths from 400 nm to 700 nm, and wherein a near infrared transmittance of the detection light through the electrochromic elements is greater than the visible transmittance through the electrochromic element; and processing the image data to generate an identification of the subject.

9. The method according to claim 8, further comprising:
authenticating an identity of the subject based on the identification.

10. The method according to claim 8, further comprising:
communicating the authentication to a vehicle control module, wherein the vehicle control module is configured to control a vehicle operation in response to the authentication.

11. The method according to claim 8, further comprising:
controlling a reflectance of a mirror element with the electrochromic element.

12. The method according to claim 11, further comprising:
controlling an electrical potential delivered to the electrochromic element thereby controlling the reflectance of the mirror element.

13. The method according to claim 8, wherein the display light transmitted through the electrochromic element depicts a portion of the subject required for the identification.

14. A vehicle passenger identification system comprising:
an electrochromic element comprising:
a first substrate comprising a first surface and a second surface;
a second substrate comprising a third surface and a fourth surface, wherein the first substrate and the second substrate form a cavity wherein a transflective dielectric coating comprising alternating layers of a plurality of high refractive index (H) materials and a plurality of low refractive index (L) materials is disposed on one of the third surface and the fourth surface; and
an electrochromic medium contained in the cavity;
an image sensor directed toward the fourth surface and configured to capture image data of an object through the electrochromic element, wherein the electrochromic element is configured to transmit an emission of near infrared light; and
a video display configured to emit visible light disposed proximate to the fourth surface and configured to transmit the visible light over a range of visible wavelengths, wherein the range of visible wavelengths comprises an average visible transmittance of at least 20% over a visible range from 400 nm to 700 nm through the electrochromic element and wherein the visible transmittance through the electrochromic element comprises a shift in a green-red color coordinate (a*) and blue-yellow color coordinate (b*) of less than 5, wherein the image sensor is configured to capture the image data to identify at least one passenger of the vehicle.

15. The system according to claim 14, wherein the light source comprises a first emitter disposed on a first side of the image sensor and a second emitter disposed on a second side of the image sensor.

16. The system according to claim 14, wherein the near infrared light comprises a wavelength of approximately 800 nm to 940 nm.

* * * * *

UNITED STATES PATENT AND TRADEMARK OFFICE
CERTIFICATE OF CORRECTION

PATENT NO. : 10,769,434 B2
APPLICATION NO. : 15/372875
DATED : September 8, 2020
INVENTOR(S) : Weller et al.

Page 1 of 1

It is certified that error appears in the above-identified patent and that said Letters Patent is hereby corrected as shown below:

In the Claims

Column 14, Line 21, Claim 8 "elements" should read --element--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*